J. SAUNDERS.
PACKING DEVICE.
APPLICATION FILED MAY 29, 1908.
898,786.
Patented Sept. 15, 1908.
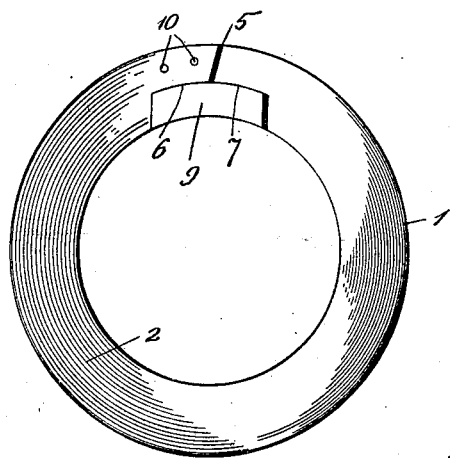
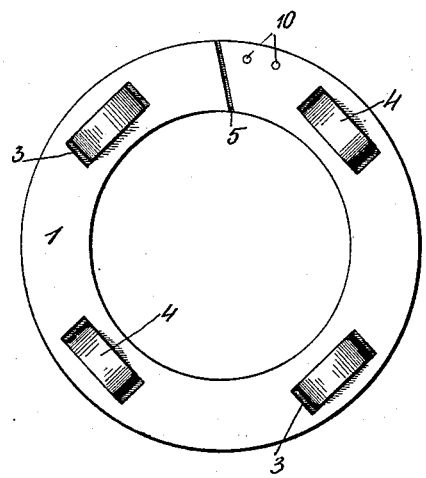
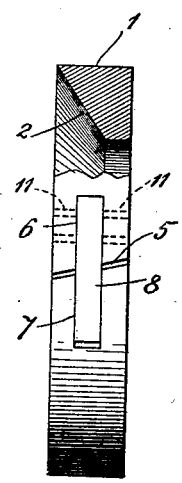
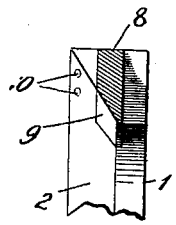
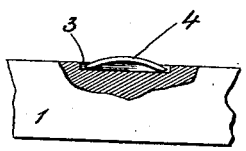
Witnesses
A. H. Rabsag,
N. H. Butler
Inventor
James SAUNDERS,
By H. C. Everitt
Attorneys

UNITED STATES PATENT OFFICE.

JAMES SAUNDERS, OF EAST McKEESPORT, PENNSYLVANIA.

PACKING DEVICE.

No. 898,786.        Specification of Letters Patent.        Patented Sept. 15, 1908.

Application filed May 29, 1908. Serial No. 435,794.

*To all whom it may concern:*

Be it known that I, JAMES SAUNDERS, a subject of the King of Great Britain, residing at East McKeesport, in the county of Allegheny and State of Pennsylvania, have invented certain new and useful Improvements in Packing Devices, of which the following is a specification, reference being had therein to the accompanying drawing.

This invention relates to a packing that can be advantageously used in connection with valves, pistons, oil well devices, and structures where it is desired to use packing that will be positive in its action.

The primary object of my invention is to provide a simple, durable and inexpensive packing comprising a split ring having the ends thereof connected to allow for expansion and contraction.

A further object of this invention is to utilize springs as a cushioning medium for a packing and for normally retaining the seat of the packing in positive engagement with the structure packed.

With the above and other objects in view which will readily appear as the invention is better understood, the same consists in the novel construction, combination and arrangement of parts to be presently described and then specifically pointed out in the appended claims.

In the drawings, Figure 1 is a top plan of my packing, Fig. 2 is a bottom plan of the same, Fig. 3 is an edge view partly broken away and partly in section, Fig. 4 is a cross sectional view of a portion of the packing illustrating a segment shaped connecting member, and Fig. 5 is an edge view of a portion of the packing partly broken away and partly in section illustrating one of the springs of the packing.

In the accompanying drawings 1 designates a split ring having one face thereof beveled to form a seat, as at 2, while the opposite face thereof is provided with a plurality of oblong recesses 3 for flat springs 4, sufficient space being provided in said recesses for the expanding of said springs.

The confronting ends of the split ring or annulus are beveled, as at 5 and provided with two alining slots 6 and 7, said slots providing a radially disposed opening intersecting the beveled seat 2 of the packing. The slots 6 and 7 are adapted to receive a connecting member 8 of less length than the combined length of the slots 6 and 7. The member 8 is beveled, as at 9, in order not to interrupt the seat 2 of the packing, and to retain the member within the slots 6 and 7 and in engagement with one end of the ring or annulus pins 10 are employed, said pins passing through alining openings 11 provided therefor transversely of the ring or annulus 1. In making the connecting member 8 of less length than the slots 6 and 7, sufficient space is provided for the expansion and contraction of said ring, and the connecting member is adapted to prevent sidewise motion of the confronting ends of a ring.

The packing can be made of brass, hard rubber, leather or any durable or flexible material.

While in the drawings there is illustrated the preferred embodiments of my invention it is to be understood that the elements therein can be varied or changed without departing from the spirit of the invention.

Having now described my invention what I claim as new, is:—

1. A packing comprising a split ring having a beveled seat, said ring having a plurality of recesses formed therein, a spring mounted in each recess, confronting ends of said ring having slots formed therein, a connecting member of less length than said slots and adapted to fit therein, said member being beveled to conform to the seat of said ring, and pins arranged transverse of one end of said ring for holding said member within said slots.

2. A packing comprising a split ring having a beveled seat, said ring having a plurality of recesses formed therein, a spring mounted in each recess, confronting ends of said ring having slots formed therein, a connecting member of less length than said slots and adapted to fit therein, said member being beveled to conform to the seat of said ring, and means for securing said member to one end of said ring.

3. A packing comprising a split ring having a beveled seat, and a connecting member secured in one end of said ring and extending into the opposite end thereof, said member being beveled to conform to the seat of said ring.

In testimony whereof I affix my signature in the presence of two witnesses.

JAMES SAUNDERS.

Witnesses:
    MAX H. SROLOVITZ,
    C. V. BROOKS.